(12) United States Patent
MacKinnon

(10) Patent No.: US 6,193,926 B1
(45) Date of Patent: Feb. 27, 2001

US006193926B1

(54) PROCESS FOR MAKING MOLDED GLASS AND CERAMIC ARTICLES

(75) Inventor: Robin J. MacKinnon, Duluth, GA (US)

(73) Assignee: Heraeus Amersil, Inc., Duluth, GA (US)

( * ) Notice: Subject to any disclaimer, the term of this patent is extended or adjusted under 35 U.S.C. 154(b) by 0 days.

(21) Appl. No.: 09/389,598

(22) Filed: Sep. 3, 1999

(51) Int. Cl.[7] .................................................. B28B 1/26
(52) U.S. Cl. .............................. 264/621; 264/642
(58) Field of Search .................... 264/621, 642, 264/660

(56) References Cited

U.S. PATENT DOCUMENTS

| | | | |
|---|---|---|---|
| 3,775,141 | 11/1973 | Weidman | 106/65 |
| 3,804,650 | 4/1974 | Meissner et al. | 106/84 |
| 3,821,070 | 6/1974 | Mansmann et al. | 161/172 |
| 4,419,115 | 12/1983 | Johnson, Jr. et al. | 65/3.12 |
| 4,528,163 | 7/1985 | Albrecht | 422/249 |
| 4,530,722 | 7/1985 | Moore et al. | 106/38.35 |
| 4,574,063 * | 3/1986 | Scherer | 65/18.1 |
| 4,602,667 | 7/1986 | Moore et al. | 164/7.1 |
| 4,605,428 | 8/1986 | Johnson, Jr. et al. | 65/2 |
| 4,622,056 | 11/1986 | Matsuo et al. | 65/18.1 |
| 4,680,049 | 7/1987 | Onorato et al. | 65/18.1 |
| 4,776,867 | 10/1988 | Onorato et al. | 65/18.1 |
| 4,840,653 | 6/1989 | Rabinovich | 65/3.12 |
| 4,883,521 | 11/1989 | Shimizu et al. | 65/17 |
| 4,888,036 | 12/1989 | Clasen | 65/18.1 |
| 5,114,881 | 5/1992 | Kaneko et al. | 501/12 |
| 5,174,801 | 12/1992 | Matsumura et al. | 65/18.1 |
| 5,232,638 | 8/1993 | Thiessen et al. | 264/6 |
| 5,240,488 | 8/1993 | Chandross et al. | 65/3.11 |
| 5,379,364 | 1/1995 | Chandross et al. | 385/143 |
| 5,389,582 | 2/1995 | Loxley et al. | 501/4 |
| 5,547,482 | 8/1996 | Chalk et al. | 65/17.2 |
| 5,944,866 * | 8/1999 | Chen et al. | 65/395 |

* cited by examiner

*Primary Examiner*—Christopher A. Fiorilla
(74) *Attorney, Agent, or Firm*—Finnegan, Henderson, Farabow, Garrett & Dunner, L.L.P.

(57) ABSTRACT

A method for making molded glass and ceramic articles including dispersing fine base articles in water, adding coarse base particles to form a bimodal dispersion of base particles, adding aqueous fluorine, agitating the dispersion of base particles and fluorine, and molding the dispersion of base particles and fluorine.

10 Claims, No Drawings

PROCESS FOR MAKING MOLDED GLASS AND CERAMIC ARTICLES

BACKGROUND OF THE INVENTION

1. Field of the Invention

The present invention relates to methods for making molded glass and ceramic articles. More particularly, the present invention relates to an improved sol-gel method for making molded glass and ceramic articles using aqueous fluorine to initiate a gel reaction.

2. Description of the Related Art

One of the established methods of making glass and ceramic articles is known as the "sol-gel" method. When making articles using this process, a base material in the form of fine particles is mixed with water and various stabilizing ingredients to form a stable dispersion or "sol." To this sol, an "initiator" is added to destabilize the dispersion, causing the fine particles to bond together and form a "gel." One common initiator is aqueous fluorine, which is typically added as hydrofluoric acid or ammonium hydrofluoride. Upon adding the initiator, the dispersion may be transferred to a mold. After the dispersion gels, the gel is removed from the mold, dried, and fired.

One problem inherent in the sol-gel method arises from adding the initiator. If the initiator is added directly to the sol, problems may arise in controlling the gelling process. For example, the sol may gel before it can be transferred to the mold. One technique to solving this problem when using fluorine as the initiator is disclosed in U.S. Pat. No. 4,840,653, issued to Rabinovich. This patent discloses reacting a silicon-containing organic chemical with water and hydrofluoric acid to create a fluorinated form of finely divided silica. A small amount of this material is then added to a dispersion of nonfluorinated fine silica to initiate the gelling reaction in a timely and controlled fashion.

SUMMARY OF INVENTION

It is an object of the invention to provide an improved method of making molded glass and ceramic articles using the sol-gel process in which an aqueous fluorine initiator can be added directly to the dispersion of fine base particles without premature gelling.

To achieve this and other objects and in accordance with the purpose of the invention, as embodied and broadly described herein, the invention includes a method for making molded glass and ceramic articles comprising (i) dispersing base particles having an average particle of size below 1 micron in water to form a dispersion of fine base particles, (ii) adding base particles having an average particle size above 1 micron to the dispersion of fine base particles to form a dispersion of bimodal base particles, (iii) adding aqueous fluorine to the dispersion of bimodal base particles to form a dispersion of bimodal base particles and fluorine, (iv) agitating the dispersion of bimodal base particles and fluorine with sufficient force to delay gel formation, (v) transferring the dispersion of bimodal base particles and fluorine to a mold; (vii) allowing the dispersion of bimodal base particles and fluorine to form a gel, and (vii) removing the gel from the mold for drying and firing.

The advantages of the present invention are that premature gelling is avoided using a simplified process, adding aqueous fluorine directly as an initiator without requiring the additional steps of making a fluorinated ingredient, and that the process is adaptable to a continuous production method rather than a batch process.

It is to be understood that both the foregoing general description and the following detailed description are exemplar and explanatory and are intended to provide further explanation of the invention as claimed.

DETAILED DESCRIPTION

The present invention can be used to form clear or opaque glass and ceramic articles. In a preferred embodiment, the present invention can be used to form clear or opaque silica glass articles.

In the present invention, fine base particles having an average particle size below 1 micron are dispersed in water to form a stable dispersion of fine base particles. As embodied herein, these fine base particles may be selected from the group consisting of silica, alumina, silicon carbide, and silicon nitride. In a preferred embodiment, the fine base particles are purified amorphous silica particles. Amorphous silica can be purchased commercially as fumed silica (such as CaboSil K-330, available from Cabot Incorporated) or can be obtained as waste soot from various fused silica manufacturing processes. When obtained as waste soot, the soot can be granulated and purified by chlorine treatment to yield clean aggregates of loose particles. The fine particles of amorphous silica can then be dispersed in water by ball milling in a water/ammonia solution. The fine base particles may comprise about 20–40% by weight of the dispersion of fine base particles. In a most preferred embodiment, fine particles of amorphous silica comprise about 40% by weight of the dispersion of fine base particles.

After making the stable dispersion of fine base particles, coarse base particles having an average particle size greater than 1 micron, preferably between about 1 to 40 microns, are added to the dispersion of fine base particles to form a stable dispersion of bimodal base particles. More preferably, the coarse base particles have an average particle size between about 5 to 20 microns. After adding the coarse base particles to the dispersion of fine base particles, the mixture may be ball milled to grind the larger particles and blend the mixture thoroughly so as to form a stable dispersion of bimodal base particles. In a preferred embodiment, the coarse base particles are glassy silica powder or grain, and the weight of the coarse base particles is approximately equal to the weight of the dispersion of fine base particles and water. Coarse glassy silica powder can be obtained by grinding up large pieces of waste silica glass or by sintering purified waste soot granules so that the granules turn into hard glass particles. The purity of the finished article can be controlled by using either very pure synthetic silica or standard purity fused quartz.

After making the stable dispersion of bimodal base particles, the dispersion may be de-aired and then is mixed with aqueous fluorine, preferably in the form of hydrofluoric acid or ammonium fluoride. In a preferred embodiment where the base particles are comprised of silica, at least 0.5% of fluorine by weight relative to silica is added to the dispersion of bimodal base particles. The dispersion of bimodal base particles and fluorine is then agitated with sufficient force to delay gel formation. In a preferred embodiment, a controlled flow of aqueous fluorine is brought together with the flow of the dispersion of bimodal base particles and agitated in a static mixer with high shear. After the fluorine is thoroughly dispersed, the dispersion of bimodal base particles and fluorine is directed into a mold of size and shape appropriate to the article being made. In the absence of shear, the fluorine causes the fine base particles to gel and form a semi-rigid body, with the coarse base particles acting as the filler. These coarse base particles reduce drying shrinkage and add strength and rigidity to the finished article.

After the dispersion of bimodal base particles and fluoride has gelled, the article is removed from the mold and dried. The article can then be fired at about 1350–1400 C., according to conventional glass and ceramic processing techniques.

It will be apparent to those skilled in the art that various modifications and variations can be made in the method of making molded glass and ceramic articles without departing from the spirit or scope of the invention. For example, there could be techniques other than using a static mixer to keep the dispersion of bimodal base particles and fluorine sufficiently agitated to delay gel formation prior to introduction into the mold. Thus, it is intended that the present invention cover the modifications and variations of this invention provided they come within the scope of the appended claims and their equivalents.

What is claimed is:

1. A method for making a molded glass or ceramic article, comprising:
   a. dispersing fine base particles composed of glass or ceramic materials having an average particle of size below 1 micron in water to form a dispersion of fine base particles,
   b. adding coarse base particles composed of glass or ceramic materials having an average particle size above 1 micron to the dispersion of fine base particles to form a dispersion of bimodal base particles,
   c. adding aqueous fluorine to the dispersion of bimodal base particles to form a dispersion of bimodal base particles and fluorine,
   d. agitating the dispersion of bimodal base particles and fluorine with sufficient force to delay gel formation,
   e. transferring the dispersion of bimodal base particles and fluorine to a mold,
   f. allowing the dispersion of bimodal base particles and fluorine to gel, and
   g. removing the gel from the mold for drying and firing.

2. The method of claim 1 wherein aqueous fluorine is selected from the group consisting of hydrofluoric acid and ammonium bifluoride.

3. The method of claim 2 wherein the dispersion of bimodal base particles and fluorine is agitated in a static mixer.

4. The method of claim 3 wherein the composition of the base particles is selected from the group consisting of silica, alumina, silicon carbide, and silicon nitride.

5. The method of claim 3 wherein the composition of the base particles is silica.

6. The method of claim 5 wherein the coarse base particles have an average particle size of between 1 to 40 microns.

7. The method of claim 5 wherein the coarse base particles have an average particle size of between 5 to 20 microns.

8. The method of claim 5 wherein the suspension of fine particles comprises 20–40% by weight of silica.

9. The method of claim 5 wherein the weight of the coarse base particles is approximately equal to the weight of the dispersion of fine base particles.

10. The method of claim 5 wherein the dispersion of bimodal base particles and fluorine comprises at least 0.5% by weight of fluorine relative to silica.

\* \* \* \* \*